(No Model.)
F. D. OWEN.
TUBE JOINT FOR CYCLE FRAMES.
No. 575,039. Patented Jan. 12, 1897.
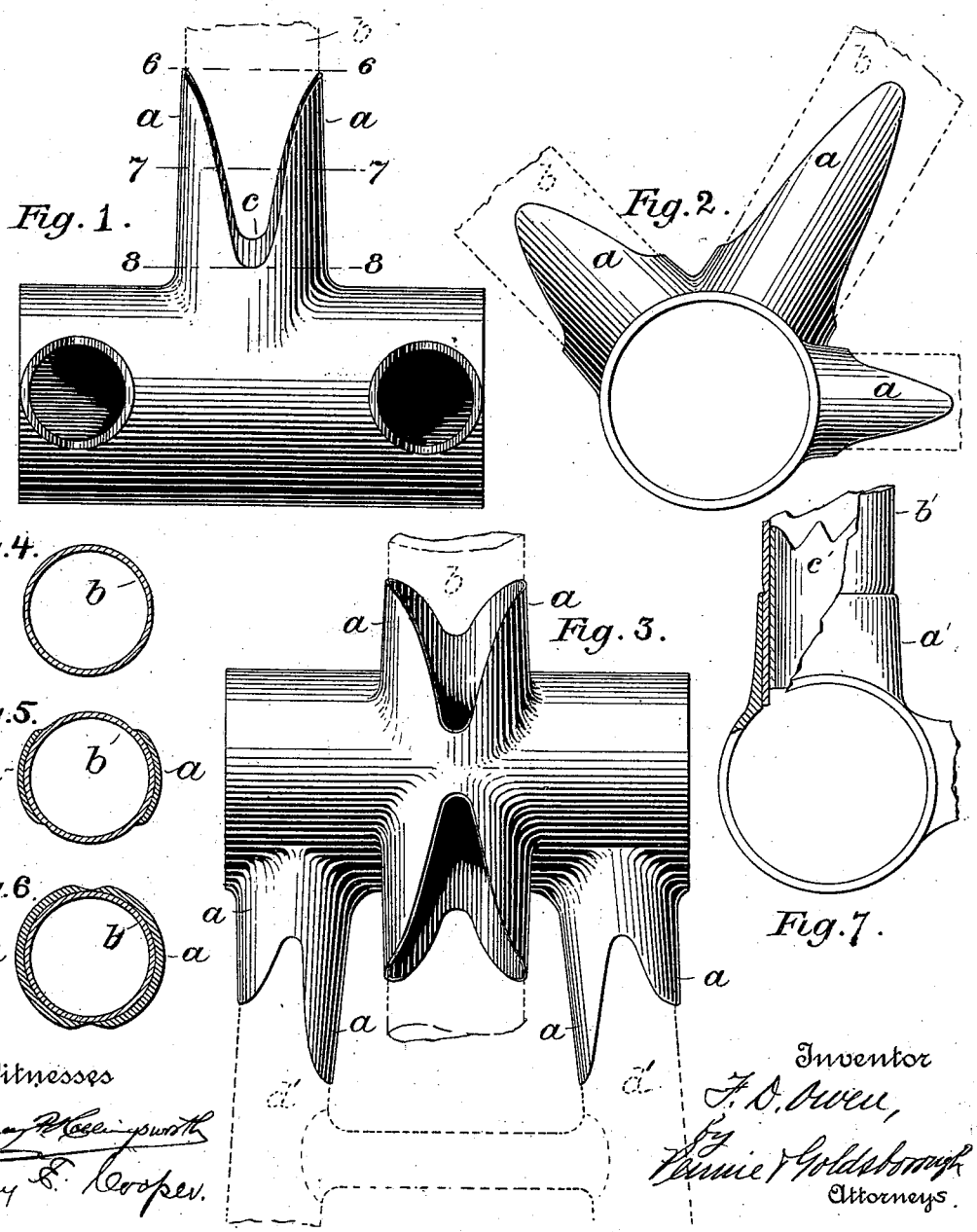

UNITED STATES PATENT OFFICE.

FREDERICK D. OWEN, OF WASHINGTON, DISTRICT OF COLUMBIA.

TUBE-JOINT FOR CYCLE-FRAMES.

SPECIFICATION forming part of Letters Patent No. 575,039, dated January 12, 1897.

Application filed June 5, 1895. Serial No. 551,763. (No model.)

*To all whom it may concern:*

Be it known that I, FREDERICK D. OWEN, a citizen of the United States, residing at Washington, in the District of Columbia, have invented certain new and useful Improvements in Tube-Joints for Cycle-Frames; and I do hereby declare the following to be a full, clear, and exact description of the invention, such as will enable others skilled in the art to which it appertains to make and use the same.

In the construction of the tubular framework of bicycles and the like it is customary to unite the ends of the sections of tubing with their corresponding sockets by inserting the tube end within the socket, brazing or welding the socket and tube end together, and subsequently dressing off the joint, as is well understood, for the purpose of removing those portions of the brazing metal and flux which remain upon the joint after the brazing operation has been completed. This dressing of the joint is effected by means of a file and is work that is usually intrusted to comparatively unskilled laborers, and as the periphery of the outer edge of the socket of the joint is circular or substantially circular in outline it results that as the file slips from the socket edge onto the tube itself there is a tendency for the file to unduly reduce the thickness of the wall of the tube along a circular line just beyond the circular edge of the socket. Even with great care this abnormal reduction is liable to take place, and when the file is in the hands of an unskilled, careless, or hasty workman the difficulty is correspondingly aggravated. Moreover, the reduction referred to takes place at a point usually subjected to the greatest strain, as, for instance, the torsional strain of the solid crank-axle case and its sockets upon the front and rear braces and seat-post, this strain being due, mainly, to the pedaling action. In this case especially is it of importance that the strength of the joint to resist torsion should be as nearly as possible that of the tubular member itself, which is apparently not the case when the wall thickness of the tube has been reduced to a materially lesser gage by the circular line of reduction referred to. To compensate for this difficulty in some measure, it has been proposed to insert within the hollow interior of the tube end, immediately before it is placed within the tubular socket, a short section of tubing of lesser diameter and to braze said short section within the tubular end simultaneously with the brazing of the tube end within the tubular socket. This in a measure remedies the difficulty, but is accompanied with additional expense and trouble, increases the weight of the frame, and frequently fails altogether because of the difficulty of obtaining a homogeneous brazing between the short inserted section and the inner wall of the tube end, and because the greater heat required for the brazing operation tends to draw the temper of the tube to too great a degree.

My invention relates to an improved construction of the dressed joints wherein whatever reduction of the tube-wall may result from the dressing-up or filing operation after the tube end has been brazed or welded within its socket takes place along a non-circular line, and wherein the socket portion of the joint is a "fish-mouth," one of its lips being longer than the other, so that as the file during the dressing operation slips from the edge of the socket portion any reduction of the tube-wall incident thereto will be along a line corresponding generally to the said contour of the socket edge.

In the accompanying drawings, Figure 1 represents the application of my invention to the crank-axle casing and shows said crank-axle casing in rear elevation. Fig. 2 represents an end elevation of the parts shown in Fig. 1. Fig. 3 represents a top-plan view thereof. Figs. 4, 5 and 6 represent, respectively, sectional views on the lines 6 6, 7 7, and 8 8 of Fig. 3. Fig. 7 represents, partly in section, the customary defective dressed-joint with its reinforcement.

Similar letters of reference indicate similar parts throughout the several views.

For clearness of illustration I have shown the tubular members of the framework in dotted lines.

In Figs. 1, 2, and 3 the joints are shown as of the fish-mouth character, *i. e.*, the socket portions of the joints are provided with projecting lips *a a*, with corresponding intermediate recesses, so that when the joint is brazed and the surplus metal removed by filing the line of reduction caused by the slip of the file will be of a non-circular character, as hereinbefore described. I do not desire, however, to be understood as claiming this feature broadly, but only when employed in a fish-mouth joint wherein one of the lips is longer than the other, as indicated, for instance, in the joints shown for connecting the rear reaches of the frame to the crank-axle casing. By thus making one of the lips longer than the other I add to the lip which is the longer the metal taken away from the shorter lip, thereby securing an increased bracing action for the same weight of metal when the strain is exerted from a point opposite the longer lip. Furthermore, under like conditions of strain the brazing between the short lip and the spigot member of the joint has not the tendency to open up that it would have were said lip longer. At the same time the other lip subserves the useful function of preventing the spigot member from tilting out of the socket when subjected to great strains, and the non-circular line of reduction is still present to add strength and stability to the joint.

In practice the socket portion will be bored cylindrically, as is customary, to accommodate the corresponding cylindrical wall of the tube, and the thickness of the wall of the socket will decrease from its base upwardly in such manner as to make the outer surface of the socket form a frustum of a cone, so that the subsequent filing may be reduced to just what is sufficient to clean up the joint. This difference in wall thickness of the socket portion is illustrated more fully in Figs. 5 and 6, wherein $b$ indicates the tubular section of the joint within the lips $a$ $a$ of the socket.

In forming the joint the tube end is inserted within the socket and the flux and brazing metal applied and the brazing operation otherwise completed in the usual manner. The joint is then dressed by the file, so as to remove the brazing metal and flux from the surface of the joint, except a small fillet of the metal, which is preferably left at the base of the recess and extending up along the sides of the lips, as indicated at $c$ in Fig. 1. In the joint shown in the upper portion of Fig. 1 the line of greatest reduction due to the filing is approximately defined by the outlying edge of the fillet $c$ and the continuation thereof where such edge merges into the edges of the lips. This line of greatest reduction is bridged across the intervals separating the lips from each other by practically unreduced arched portions of the tube-wall, as is shown, for instance, in Fig. 5.

By reference to Figs. 1, 2, and 3 it will be noted that the lips of the socket portion are arranged with reference to the main body portion of the crank-axle casing in such manner as to be transverse to the longitudinal axis of the crank-axle casing. This is a feature of importance in connection with my invention for the reason that the torsional strain is thereby transmitted to the tube-wall in manner to be more efficiently taken up thereby than if the tongues were in the same plane with the longitudinal axis of the crank-axle casing.

For purposes of comparison I have shown in Fig. 7 the construction of dressed joint now commonly in use, together with the reinforcing tube-section sometimes employed. In this figure $a'$ indicates the socket, $b'$ the tube member of the bicycle-frame, and $c'$ the reinforcing-piece brazed thereon. The action of the file in dressing up a joint of this character is indicated by the reduction of the tube-wall along the circular edge of the socket portion $a'$. In order to strengthen still further joints of this character, it has even been thought necessary in many instances to unite the rear reaches $d'$ (see Fig. 3) by a piece of tubing $e'$, joining the two. In the practice of my invention I have found it entirely unnecessary to employ any such additional strengthening device on account of the reliability of the two dressed joints for these rear reaches, and in fact would not use it at all except to gratify the fancy of the trade, which is accustomed to its presence.

Having thus described my invention, what I claim, and desire to secure by Letters Patent, is—

A dressed tube-joint, made up of a tube end brazed or welded within a socket, the edge of the socket being of fish-mouth outline, one of the lips of the fish-mouth being longer than the other and the line of reduction of the tube end wall due to dressing being of such a nature that its parts are connected by portions of said tube end; substantially as described.

In testimony whereof I affix my signature in presence of two witnesses.

FREDERICK D. OWEN.

Witnesses:
 HENRY E. COOPER,
 MARGARET V. COOPER.